(12) United States Patent
Ross et al.

(10) Patent No.: US 6,845,343 B2
(45) Date of Patent: Jan. 18, 2005

(54) SAFETY CABINET WITH SAFETY MONITORING SYSTEM

(75) Inventors: Gerd Ross, Frankfurt (DE); Walter Glück, Hasselroth (DE)

(73) Assignee: Kendro Laboratory Products, GmbH, Hanau (DE)

( * ) Notice: Subject to any disclaimer, the term of this patent is extended or adjusted under 35 U.S.C. 154(b) by 0 days.

(21) Appl. No.: 10/419,146

(22) Filed: Apr. 21, 2003

(65) Prior Publication Data

US 2004/0009102 A1 Jan. 15, 2004

(30) Foreign Application Priority Data

Apr. 22, 2002 (DE) .......................................... 102 17 904

(51) Int. Cl.[7] .......................... G06F 19/00; B08B 15/02
(52) U.S. Cl. ....................................... 702/183; 702/83
(58) Field of Search ...................... 702/34, 35, 81–84, 702/182–185; 454/56, 61

(56) References Cited

U.S. PATENT DOCUMENTS

| | | | | |
|---|---|---|---|---|
| 5,733,188 A | * | 3/1998 | Jacob ........................... | 454/56 |
| 5,951,394 A | * | 9/1999 | Pariseau ...................... | 454/61 |
| 6,697,747 B2 | * | 2/2004 | Marshall Smith ............ | 702/83 |

* cited by examiner

*Primary Examiner*—Marc S. Hoff
*Assistant Examiner*—Paul L Kim
(74) *Attorney, Agent, or Firm*—Baker & Hostetler LLP

(57) ABSTRACT

The invention pertains to a safety cabinet with a workspace that is surrounded by a housing and is accessible on the front side of the housing through a work opening that can be closed with an adjustable front window. The safety cabinet comprises a safety monitoring system for monitoring various device functions. The safety monitoring system also contains a processor that computationally links measuring data determined during the monitoring of predetermined device functions and/or device parameters stored in the safety monitoring system in such a way that a characteristic number is obtained as the result of the calculation, wherein said characteristic number makes it possible to deduce the entire status of the safety cabinet.

11 Claims, 2 Drawing Sheets

SAFETY CABINET WITH SAFETY MONITORING SYSTEM

Figure 1:
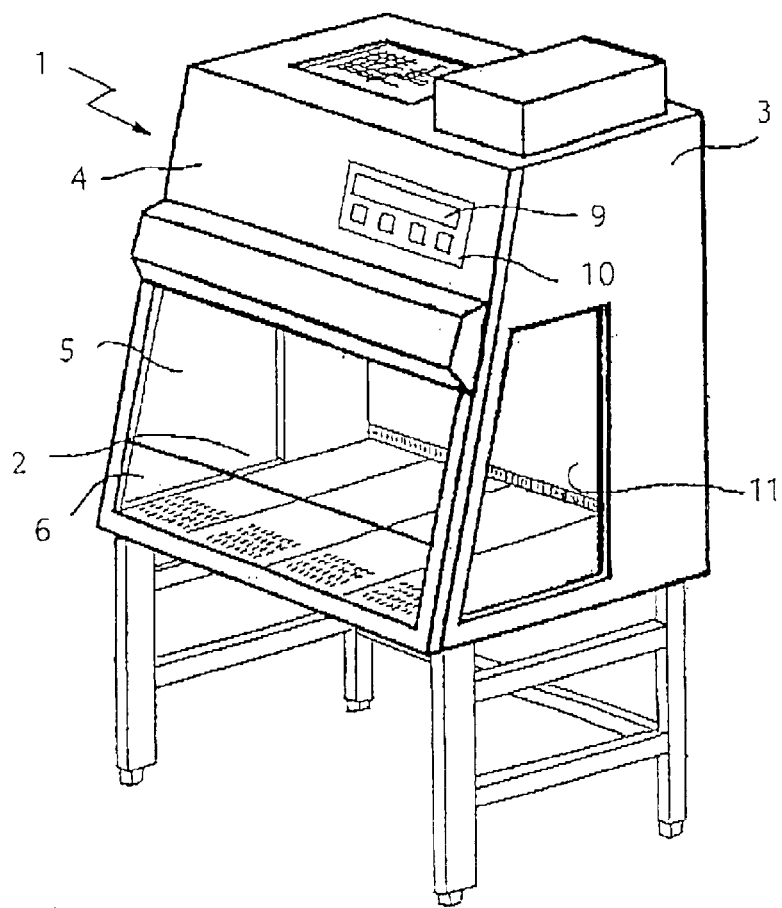

The invention pertains to a safety cabinet with a safety monitoring system that makes it possible to monitor the entire status of the safety cabinet.

Safety cabinets and, in particular, microbiological cabinets for processing microbiological specimens, e.g., of the type described in DE 4441784 C2, are subject to different international approval requirements and constructed, tested and approved in accordance with respective national standards. One prerequisite for the operation of such cabinets is periodic controls and checks by authorized service personnel. When a safety cabinet is checked, the individual device components are tested with respect to their functionality. Measurements pertaining to the operator protection may—in accordance with applicable regulations—also be carried out, for example, the so-called KI-Discus operator protection factor according to DIN EN 12469, BS 5726, DIN 12980. It is also common practice to monitor certain device functions during the operation of the safety cabinet and to notify the operator of malfunctions, for example, by triggering an optical or acoustical alarm. However, all the measuring results obtained during the operation or servicing of the safety cabinet respectively pertain to separate device functions or an individual device parameter. The entire status of the safety cabinet cannot be evaluated based on these individual measuring values.

The invention is based on the objective of disclosing a safety cabinet with a safety monitoring system that makes it possible to evaluate the entire status of the safety cabinet.

This objective is attained with a safety cabinet according to claim 1. Other embodiments are disclosed in the dependent claims.

The invention consequently pertains to a safety cabinet that, in principle, may have the same design as a conventional safety cabinet and comprises a work space that is surrounded by a housing and is accessible on the front side of the housing through a work opening that can be closed with an adjustable front window. A safety cabinet of this type is, for example, described in DE 4441784 C2. The safety cabinet according to the invention differs from a conventional safety cabinet in that it comprises a safety monitoring system with a processor. The processor computationally links measuring data that are obtained during the monitoring of predetermined device functions while the safety cabinet is in operation and/or device parameters stored in the safety monitoring system. The result of this computational linking is a characteristic number that makes it possible to deduce the entire status of the safety cabinet.

The computationally determined characteristic number can be displayed to the operator of the safety cabinet by means of a display element. This may be realized with a display element that is provided on the safety cabinet or with a separate display element that is exclusively used for displaying the characteristic number.

The measuring data for the predetermined device functions may, in principle, be conventionally obtained in accordance with the state of the art. This also applies to the determination of certain device parameters, for example, the above-mentioned operator protection factor.

It is preferred to store a point scale for each measured device function in the safety monitoring system in order to calculate the characteristic number. A certain measuring value that, for example, is obtained during the automatic control of a certain device function while the safety cabinet is in operation corresponds to a certain point value on the point scale. The processor assigns a numerical value to the transmitted measuring value in accordance with the point scale, and this numerical value is used for calculating the characteristic number. A numerical value that is used in the formula for calculating the characteristic number is determined for each device function to be taken into account in the calculation of the characteristic number of the safety cabinet, namely with the aid of point scales stored in the safety monitoring system.

This also applies to the device parameters that are stored in the safety monitoring system and, for example, were determined before the start-up of the safety cabinet or during a check of the safety cabinet by service personnel. In this case, a point scale also corresponds to each of the determined device parameters such that a certain numerical value for the calculation can be assigned to each device parameter.

Due to the computational linking of the numerical values that respectively correspond to a device parameter or a device function, an absolute value is obtained which combines the individual results for certain device statuses with one another and thusly indicates the entire status of the safety cabinet. In this case, it is practical to assign a particularly high weighting to device functions or device parameters that are particularly important for the safe operation of the safety cabinet. Device functions or device parameters that are particularly important for the safe operation consequently are incorporated into the calculation of the characteristic number with a higher weighting than less important device functions or device parameters. The respective weighting is, for example, chosen in dependence on the desired safety standard of the safety cabinet and on the intended use. The different weighting of the various device functions and parameters in the calculation of the characteristic number may be realized in the form of differences in the respectively assigned point scales. For example, important device functions or parameters are assigned higher point values than less important functions or parameters. Alternatively, the numerical values determined for important device functions or parameters may be taken into account several times in the formula for calculating the characteristic number if the point scales have the same range. In one preferred embodiment, numerical values determined for device functions or device parameters that are particularly important for the safe operation of the safety cabinet are used as multipliers in the calculation. Less important device functions or parameters, in contrast, are only additively incorporated into the formula.

For reasons of simplicity, it is preferred to linearly correlate device functions or device parameters with the corresponding point scale. In this case, an optimal function preferably corresponds to the highest value on the scale and an insufficient function corresponds to the lowest value on the scale. It may be practical to assign the value zero to the lowest point on the scale. In this case, an insufficient function of the device results in the processor of the safety monitoring system of the safety cabinet according to the invention outputting the value zero. If this numerical value is used as a multiplier in the formula for calculating the characteristic number, the product is also zero, namely even if the measurements of other device functions or device parameters indicated satisfactory results. The thusly calculated characteristic number zero would indicate an unstable operation of the safety cabinet because an important device parameter or an important device function lies outside the acceptable range.

The calculated characteristic number can be output on a display element. In order to allow a simple evaluation of the characteristic number by the operator of the safety cabinet, the characteristic number is preferably output in the form of a percentage, wherein 100% represents an optimal function and 0% represents an unstable operation. If so required, evaluation criteria in the form of text displays or the like may also be stored in the safety monitoring system for the calculated characteristic numbers. For example, it would be conceivable to display the text "safety cabinet unstable" or the like instead of or in addition to the characteristic number zero. It would also be conceivable to trigger an optical and/or acoustical alarm if the calculated characteristic number lies within a critical range. This alarm usually does not serve as a replacement for alarm messages generated during the individual monitoring of certain device functions. On the contrary, it is preferred to still utilize conventional monitoring systems known from the state of the art and to continue the customary monitoring of individual device functions in accordance with the state of the art.

The question of which device functions and device parameters should be monitored with the safety monitoring system of the safety cabinet according to the invention primarily depends on the intended use of the safety cabinet. However, all functions that are particularly important for the safe operation of the safety cabinet are taken into account in the calculation of the characteristic number. At least two of the device functions or device parameters listed below are incorporated into the calculation: exhaust air speed, volumetric exhaust air flow, circulated air speed, volumetric circulated air flow, power reserve of the exhaust air fan, power reserve of the circulated air fan, KI-Discus (operator protection factor) and filter operating time. Among these criteria, the following parameters and functions are particularly important for the safe operation of the safety cabinet and are consequently incorporated into the calculation of the characteristic number as multipliers: exhaust air speed, volumetric exhaust air flow and KI-Discus (operator protection factor).

As mentioned above, the respective device functions are, in principle, determined with conventional measuring devices in accordance with the state of the art. Among the previously described criteria, the exhaust air speed, the circulated air speed, the volumetric exhaust air flow and the volumetric circulated air flow are device functions that are determined during the operation of the safety cabinet. In this case, it is customary to either measure the exhaust air speed or the volumetric exhaust air flow in order to obtain information on the functionality of the exhaust air system of the safety cabinet. This applies analogously to the circulated air system. Consequently, it would also be conceivable to respectively measure the exhaust air speed and the volumetric exhaust air flow on one hand and the circulated air speed and the volumetric circulated air flow on the other hand simultaneously, wherein the respectively determined measuring values are collectively taken into account in the formula for calculating the characteristic number. The measurement may, for example, be carried out with the aid of pressure elements, and the determined measuring values are transmitted to the processor of the safety monitoring system according to the invention, in which the corresponding numerical value is assigned to the measuring results in order to calculate the characteristic number.

The power reserve of the exhaust air fan and the circulated air fan, the operator protection factor and the filter operating time are service parameters, for which data stored in the safety monitoring system are used in order to calculate the characteristic number. The KI-Discus operator protection factor is, for example, determined after the installation of the safety cabinet and subsequently within certain service intervals, namely in accordance with the above-cited standards. The operator protection factor is determined and stored in the safety monitoring system by the service personnel, and the stored value is used for calculating the characteristic number in the processor.

The power reserve of the exhaust air fan or the circulated air fan preferably is already stored in the safety monitoring system during the manufacture of the safety cabinet. For example, the control voltage for operating the fan serves as the criterion for the power reserve of the fan. If the fan is only operated with 75% of the maximum control voltage instead of the maximum control voltage of 100%, the fan has a power reserve of 25%. This value is stored in the safety monitoring system, and a point value on the corresponding point scale which is subsequently incorporated into the calculation of the characteristic number is assigned to this value. Alternatively, it would naturally also be conceivable to directly store the point value assigned to the power reserve in the system for use in the calculation of the characteristic number.

In order to determine the filter operating time, the time at which the filter was installed into the safety cabinet or replaced can be stored in the safety monitoring system. Based on this initial value, a timer provided in the safety cabinet determines the current operating time of the filter which is also incorporated into the calculation of the characteristic number after being assigned a corresponding point value. The calculation of the characteristic number may take place continuously or in predetermined intervals.

According to one particularly preferred embodiment of the invention, the calculation is carried out in accordance with the formula $(A+B+C+D) \times E \times F$. The letters A-F correspond to the determined numerical values for individual device functions or device parameters, namely A=circulated air speed or volumetric circulated air flow, B=power reserve of the exhaust air fan, C=power reserve of the circulated air fan, D=filter operating time, E=exhaust air speed or volumetric exhaust air flow and F=KI-Discus (operator protection factor).

A glance at this formula indicates that the exhaust air speed or the volumetric exhaust air flow and the KI-Discus operator protection factor are particularly important criteria for the safe and reliable function of the safety cabinet. If an inferior (low) value is determined for the exhaust air speed or the volumetric exhaust air flow or the KI-Discus operator protection factor, a low characteristic number that indicates an inferior operating state of the safety cabinet also results from the calculation in the processor of the safety monitoring system.

Figure 2:
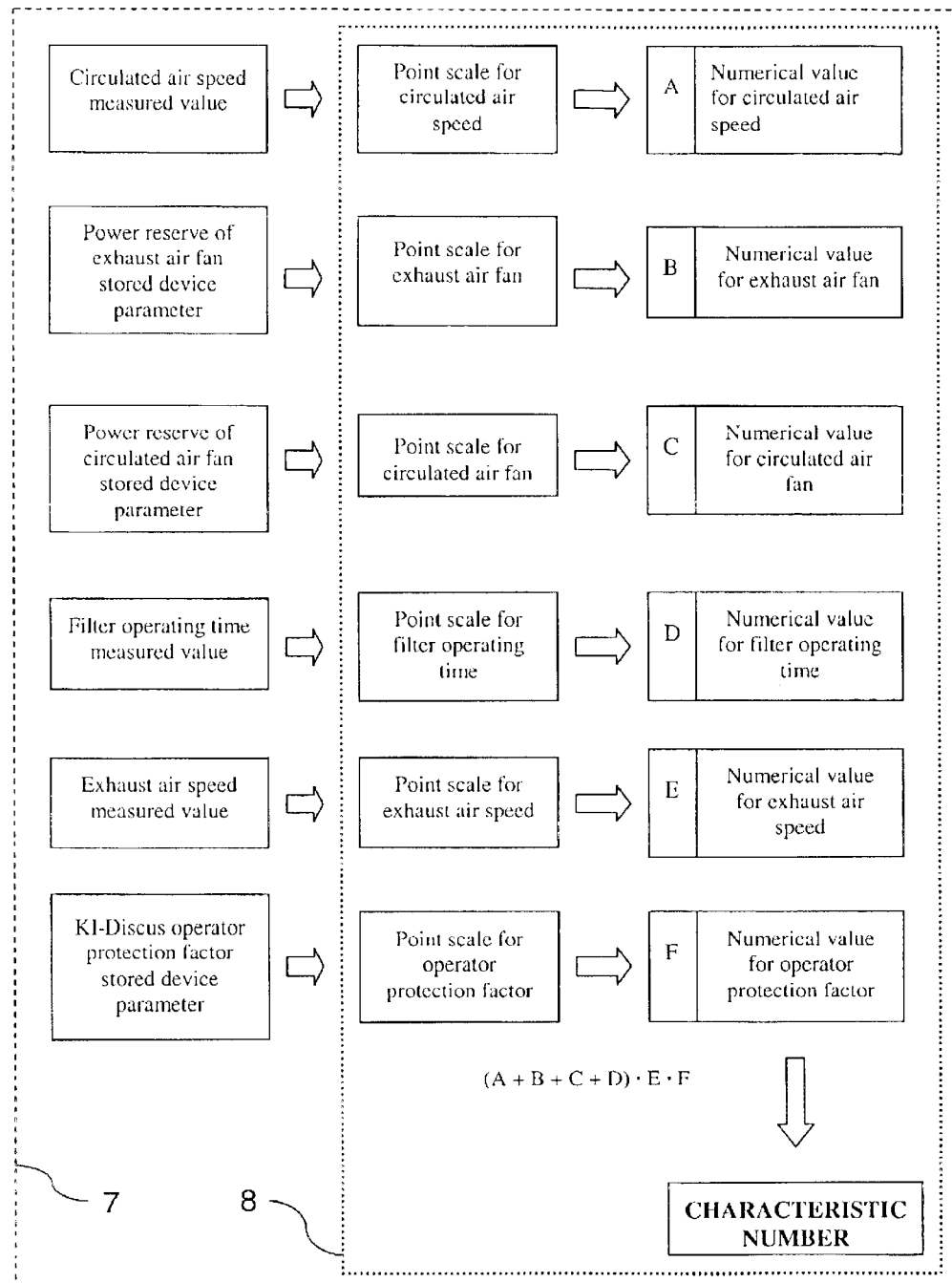

The invention is described in greater detail below with reference to the figures. The figures show:

FIG. 1, a schematic representation of the safety cabinet according to the invention, and FIG. 2, a schematic block diagram for elucidating the calculation of the characteristic number in the safety cabinet according to the invention.

FIG. 1 shows a safety cabinet 1 according to the invention that, for example, is used for processing microbiological cultures. The basic design of the safety cabinet 1 corresponds to the known state of the art, for example, as described in DE 4441784 C2. The safety cabinet 1 comprises a work area 2 that is enclosed by a housing 3 and is accessible through a work opening 6 on the front side 4 of the safety cabinet 1. The work opening 6 can be closed with an adjustable front window 5. An operating unit 10 with a display element 9, for example, a conventional display, is integrated into the front side 4 of the housing. The operating unit 10 makes it possible to conventionally control various device functions. For example, the operating unit 10 serves for adjusting the front window 5, for switching the lights on and off, for controlling the device ventilation, for controlling (not-shown) power outlets integrated into the device, etc.

Monitoring systems for monitoring the functions of individual device components are also integrated into the safety cabinet 1. These monitoring systems are also not illustrated in the figure and consist of conventional monitoring systems known from the state of the art. The device functions to be monitored in the safety cabinet 1 according to the invention may, in principle, vary. In the embodiment shown, a sensor that measures the exhaust air speed is arranged in the exhaust air system. Another sensor is arranged in the circulated air system in order to determine the circulated air speed. These sensors form part of the safety monitoring system 7 (FIG. 2) of the safety cabinet 1 according to the invention.

The values for the exhaust air speed and the circulated air speed determined during the operation of the safety cabinet are transmitted to a microprocessor 8 that compares the determined values with point scales, in which the respectively determined measuring results are assigned a certain numerical value. This process is illustrated in a simplified fashion in the block diagram according to FIG. 2. The processor 8 for calculating the characteristic number of the safety cabinet 1 according to the invention may, for example, be integrated into the operating element or arranged at any other location of the safety cabinet. The operating element 10 and the display element 9 also do not necessarily have to be arranged on the front side 4 of the safety cabinet 1. For example, these elements may also be integrated into the rear wall 11 in the interior 2 of the safety cabinet.

In the embodiment shown, the KI-Discus operator protection factor, the filter operating time, the power reserve of the exhaust air fan and the power reserve of the circulated air fan are also taken into account in the evaluation of the entire status of the safety cabinet by means of the characteristic number in addition to the exhaust air speed and the circulated air speed.

The power reserves of the exhaust air fan and the circulated air fan represent device parameters that usually are already determined during the manufacture of the safety cabinet. As initially mentioned, the maximum control voltage of the fan may be used as the basis for calculating the power reserve. In this case, the maximum control voltage corresponds to 100 percent and the actually used control voltage corresponds to x percent. This means that the power reserve of the fan is 100–x percent. The determined power reserve of the fan is stored in the safety monitoring system 7 of the safety cabinet 1. As with the circulated air speed and the exhaust air speed, a point scale respectively corresponds to the power reserves of the exhaust air fan and the circulated air fan, wherein said point scales are also stored in the safety monitoring system 7. The numerical values that correspond to the respective power reserves are determined and used by the processor 8 for calculating the characteristic number of the safety cabinet as schematically illustrated in FIG. 2.

The operator protection factor is processed accordingly. The KI-Discus operator protection factor is initially determined before the commissioning of the safety cabinet 1. The determined operator protection factor is then stored in the safety monitoring system 7. The corresponding numerical value for calculating the characteristic number is read out of the point scale for the operator protection factor and used for calculation by the processor. If the operator protection factor changes with safety cabinet servicing and recalibration, the new operator protection factor is stored in the safety monitoring system 7 and used for the ensuing calculations of the characteristic number.

The filter operating time is determined with the aid of a timer that is integrated into the safety cabinet. The timer is set to zero before the initial commissioning of the safety cabinet 1 or after the filter is exchanged. The time period elapsed from the zero time setting is then used for calculating the filter operating time. A numerical value is periodically assigned to the time period determined in the safety monitoring system 7 from the point scale stored in the safety monitoring system, and this numerical value is used for calculating the characteristic number in the processor 8.

The correlation between the point scales and the corresponding device functions and device parameters is described in greater detail below. This description is respectively based on conventional measuring value ranges and parameter ranges for safety cabinets. The highest numerical value of the corresponding point scale respectively corresponds to the optimal value for the safe operation of the safety cabinet. The lowest numerical value of the corresponding point scale respectively corresponds to the most inferior value for the operation of the safety cabinet. The intermediate values of the device parameters or measuring data and the corresponding point values are correlated linearly. Details of the allocation of the point values to the measured device functions and device parameters are provided below:

1. Exhaust air speed (E)

| | |
|---|---|
| 80–100% exhaust air | 10 points |
| 60–80% exhaust air | 10 . . . 0 points |
| <60% exhaust air | 0 points |

2. Circulated air speed (A)

| | |
|---|---|
| 80–100% circulated air | 10 points |
| 60–80% circulated air | 10 . . . 3 points |
| <60% circulated air | 3 points |

3. Power reserve of exhaust air fan (B)

| | |
|---|---|
| 20% reserve | 10 points |
| 20–0% reserve | 10 . . . 5 points |

4. Power reserve of circulated air fan (C)

| | |
|---|---|
| 20% reserve | 10 points |
| 20–0% reserve | 10 . . . 5 points |

5. Filter operating time (D)

| | |
|---|---|
| 0 hours | 10 points |
| 0–20,000 hours | 10 . . . 1 points |
| >20,000 hours | 1 point |

6. KI-Discus operator protection factor [PSF] according to DIN EN 12469 (F)

| | |
|---|---|
| 0–10 PSF | 10 points |
| 10–50 PSF | 10 . . . 5 points |
| 50–60 PSF | 5 . . . 0 points |
| >60 PSF | 0 points |

This indicates that the point scales for device functions and parameters of particular importance for the safe operation of the safety cabinet 1 lie between the numerical values 0 and 10. The lower point value for less important functions and parameters, deviations of which do not lead to a significant malfunction of the safety cabinet, is greater than 0 on the point scale. In addition, numerical values determined for less important functions and parameters are only additively incorporated into the calculation of the characteristic number while numerical values determined for important functions and parameters are incorporated in the form of multipliers. It should also be noted that the point values determined for the calculation do not necessarily have to be integral.

The point values determined in accordance with items 1–6 are used for calculating the characteristic number in the processor 8. The calculation is carried out in accordance with the formula (A+B+C+D)×E×F.

A few examples of calculating the characteristic number in accordance with this formula are provided below. The maximum attainable point value calculated in accordance with this formula is 4000 points. The characteristic number indicates the percentage of this maximum point value reached. This means that a characteristic number of 100 corresponds to the maximum point value of 4000 points while a characteristic number of zero corresponds to the minimum point value of 0 points.

EXAMPLE 1

|  |  |  | Calculated Point Value |
|---|---|---|---|
| Intake air speed (deviation in %) | 0 | E | 10 |
| Circulated air speed (deviation in %) | 0 | A | 10 |
| Power reserve of exhaust air fan (%) | 20 | B | 10 |
| Power reserve of circulated air fan (%) | 20 | C | 10 |
| Filter operating time in hours | 0 | D | 10 |
| KI-Discus (measured operator protection factor) | 1 | F | 10 |
| Calculated characteristic number |  |  | 100 |

EXAMPLE 2

|  |  |  | Calculated Point Value |
|---|---|---|---|
| Intake air speed (deviation in %) | 0 | E | 10 |
| Circulated air speed (deviation in %) | 0 | A | 10 |
| Power reserve of exhaust air fan (%) | 5 | B | 6.25 |
| Power reserve of circulated air fan (%) | 5 | C | 6.25 |
| Filter operating time in hours | 6000 | D | 7 |
| KI-Discus (measured operator protection factor) | 1 | F | 10 |
| Calculated characteristic number |  |  | 75 |

EXAMPLE 3

|  |  |  | Calculated Point Value |
|---|---|---|---|
| Intake air speed (deviation in %) | 0 | E | 10 |
| Circulated air speed (deviation in %) | 0 | A | 10 |
| Power reserve of exhaust air fan (%) | 3 | B | 5.75 |
| Power reserve of circulated air fan (%) | 3 | C | 5.75 |
| Filter operating time in hours | 10000 | D | 6 |
| KI-Discus (measured operator protection factor) | 36 | F | 7 |
| Calculated characteristic number |  |  | 50 |

EXAMPLE 4

|  |  |  | Calculated Point Value |
|---|---|---|---|
| Intake air speed (deviation in %) | 25 | E | 7.5 |
| Circulated air speed (deviation in %) | 25 | A | 7.5 |
| Power reserve of exhaust air fan (%) | 0 | B | 5 |
| Power reserve of circulated air fan (%) | 0 | C | 5 |
| Filter operating time in hours | 15000 | D | 3 |

-continued

|  |  |  | Calculated Point Value |
|---|---|---|---|
| KI-Discus (measured operator protection factor) | 42 | F | 6 |
| Calculated characteristic number |  |  | 25 |

EXAMPLE 5

|  |  |  | Calculated Point Value |
|---|---|---|---|
| Intake air speed (deviation in %) | 30 | E | 5 |
| Circulated air speed (deviation in %) | 30 | A | 5 |
| Power reserve of exhaust air fan (%) | 0 | B | 5 |
| Power reserve of circulated air fan (%) | 0 | C | 5 |
| Filter operating time in hours | 20000 | D | 1 |
| KI-Discus (measured operator protection factor) | 62 | F | 0 |
| Calculated characteristic number |  |  | 0 |

The calculated characteristic numbers are respectively rounded to a value of 5 or 10. The characteristic numbers calculated in Examples 1–5 have the following significance for the entire status of the safety cabinet 1:
Examples for Evaluating the Characteristic Number

| Cabinet stable | 100% |
|---|---|
| Cabinet stable with power reserves | 75% |
| Cabinet stable with limited power reserves | 50% |
| Cabinet stable without power reserves | 25% |
| Cabinet unstable | 0% |

The result of the calculation carried out by the processor 8, namely the characteristic number, can be displayed to the operator of the safety cabinet 1 on display element 9. Alternatively or additionally to the display of the characteristic number, a corresponding evaluation text may also be displayed on the display element.

What is claimed is:

1. A safety cabinet comprising:
   a workspace that is enclosed by a housing and is accessible through a work opening; and
   a safety monitoring system that monitors various device functions, wherein the safety monitoring system comprises a processor that analyzes data obtained from the operation of the safety cabinet and/or device parameters stored in the safety monitoring system during the monitoring of predetermined device functions, the processor is configured to obtain a characteristic number from the data and/or the parameter, wherein the characteristic number indicate the status of the cabinet calculation, wherein said characteristic number makes it possible to deduce the entire status of the safety cabinet.
   wherein numerical value that corresponds to an important device function or an important device parameter for the safe operation of the safety cabinet is incorporated into the calculation in the form of a multiplier.

2. The safety cabinet according to claim 1, wherein that the determined characteristic number is displayed on a display element.

3. The safety cabinet according to claim 1, wherein a point scale is stored in the safety monitoring system for each of the measured device functions, wherein the processor assigns a corresponding numerical value for use in the calculation of the characteristics number to a measuring value measured during the operation of the safety cabinet based on these point scales.

4. The safety cabinet according to claim 3, wherein the point scale and corresponding device functions or corresponding device parameters are linearly correlated, wherein an optimal function corresponds to the highest value of the scale and an insufficient function corresponds to the lowest value of the scale.

5. The safety cabinet according to claim 1, wherein a point scale is stored in the safety monitoring system for each stored device parameter, wherein said point scales make it possible to assign the numerical value for use in the calculation of the characteristic number to the respective device parameters.

6. The safety cabinet according to claim 1, wherein different device functions and device parameters are incorporated into the calculation of the characteristic number with a different weighting that depends a their importance for the safe operation of the safety cabinet.

7. The safety cabinet according to claim 1, wherein the point value 0 is assigned to an important device function or an important device parameter that is determined to be insufficient.

8. The safety cabinet according to claim 1, wherein the characteristic number is output in the form of a percentage, wherein 100% corresponds to an optimal function of the safety cabinet (1) and 0% correspond to an unstable operations.

9. The safety cabinet according to claim 1, wherein the fact that at least two of the device functions or device parameters listed below are incorporated into the calculation of the characteristic number is selected from the group consisting of exhaust air speed volumetric exhaust air flow circulated air speed volumetric circulated air flow power reserve of the exhaust air fan power reserve of the circulated air fan Ku-Discus (operator protection factor)

filter operating time.

10. The safety cabinet according to claim 9, wherein at least one point value determined for the device parameters or device functions listed below is incorporated into the calculation of the characteristic number in the form of a multiplier:

exhaust air speed volumetric exhaust air flow

KI-Discus (operator protection factor).

11. The safety cabinet according to claim 10, wherein the characteristic number is calculated in accordance with the formula $$(A+B+C+D) \times E \times F$$

wherein the letters correspond to the point values for the following device functions or device parameters:

A-circulated air speed or volumetric circulated air flow

B-power reserve of the exhaust air fan

C-power reserve of the circulated air fan

D-filter operating time

E-exhaust air speed or volumetric exhaust air flow

F-Ku-Discus (operator protection factor).

* * * * *